US012658050B2

(12) United States Patent
Pagot et al.

(10) Patent No.: US 12,658,050 B2
(45) Date of Patent: Jun. 16, 2026

(54) TRAILER ASSIST SYSTEM AND METHOD FOR A TOW VEHICLE

(71) Applicant: Continental Autonomous Mobility US, LLC, Auburn Hills, MI (US)

(72) Inventors: Adam Roger Pagot, Lake Orion, MI (US); Vincey Chui, Chesterfield, MI (US)

(73) Assignee: AUMOVIO Autonomous Mobility US, LLC, Auburn Hills, MI (US)

( * ) Notice: Subject to any disclaimer, the term of this patent is extended or adjusted under 35 U.S.C. 154(b) by 52 days.

(21) Appl. No.: 18/702,819

(22) PCT Filed: Oct. 18, 2022

(86) PCT No.: PCT/US2022/078246
§ 371 (c)(1),
(2) Date: Apr. 19, 2024

(87) PCT Pub. No.: WO2023/069915
PCT Pub. Date: Apr. 27, 2023

(65) Prior Publication Data
US 2025/0232674 A1 Jul. 17, 2025

Related U.S. Application Data

(60) Provisional application No. 63/262,747, filed on Oct. 19, 2021.

(51) Int. Cl.
*G08G 1/16* (2006.01)
*B60R 1/07* (2006.01)
*B60R 1/12* (2006.01)

(52) U.S. Cl.
CPC .............. *G08G 1/166* (2013.01); *B60R 1/07* (2013.01); *B60R 1/12* (2013.01)

(58) Field of Classification Search
CPC .......... G08G 1/166; G08G 1/167; B60R 1/07; B60R 1/12; G06V 20/58; B60D 1/62
See application file for complete search history.

(56) References Cited

U.S. PATENT DOCUMENTS

| | | | |
|---|---|---|---|
| 9,937,861 B2 | 4/2018 | Shehan | |
| 2005/0146607 A1 * | 7/2005 | Linn | ......................... B60R 1/30 |
| | | | 348/148 |

(Continued)

FOREIGN PATENT DOCUMENTS

| | | |
|---|---|---|
| DE | 102004037959 A1 | 2/2006 |
| DE | 102016209927 A1 | 12/2017 |

(Continued)

OTHER PUBLICATIONS

The International Search Report and the Written Opinion of the International Searching Authority mailed on Feb. 24, 2023 for the PCT Application No. PCT/US2022/078246 which this application claims priority.

*Primary Examiner* — Ashley L Redhead, Jr.

(57) ABSTRACT

A system and method for operating a trailer assist function of a for vehicle having a connected trailer includes receiving first sensor data of a first environment in a first field of view that is at least adjacent the first side of the tow vehicle and a corresponding side of the trailer. The position of the at least one first sensor relative to the tow vehicle is determined. Based on the position of the first sensor relative to the tow vehicle, a zone is determined having a length that is at least adjacent the side of the tow vehicle and the side of the trailer. Based on the first sensor data, a second vehicle in or approaching the zone is detected. In response to the detected second vehicle, sending a warning signal or a control signal to avoid a collision with the second vehicle.

16 Claims, 5 Drawing Sheets

(56)     References Cited

U.S. PATENT DOCUMENTS

| 2011/0074958 | A1  | 3/2011  | Pastrick |
| 2017/0282806 | A1  | 10/2017 | Peterson |
| 2018/0197417 | A1  | 7/2018  | Burtch |
| 2018/0301036 | A1  | 10/2018 | Villavicencio |
| 2020/0317127 | A1  | 10/2020 | Archer |
| 2021/0026019 | A1* | 1/2021  | Gahagan ............... G01S 17/931 |
| 2021/0233407 | A1* | 7/2021  | Schondorf ............. B60R 11/04 |
| 2022/0219604 | A1* | 7/2022  | Ma ......................... B60K 35/10 |

FOREIGN PATENT DOCUMENTS

| EP | 3640676    | A1 | 4/2020 |
| JP | 2001191847 | A  | 7/2001 |

* cited by examiner

TRAILER ASSIST SYSTEM AND METHOD FOR A TOW VEHICLE

CROSS REFERENCE TO RELATED APPLICATION

The present application is a National Stage Application under 35 U.S.C. § 371 of International Patent Application PCT/US2022/078246, and claims priority from. U.S. provisional patent application 63/262,747, filed Oct. 19, 2021, both applications of which are incorporated by reference herein.

TECHNICAL FIELD

This disclosure relates to a trailer assist system and method for a tow vehicle having a connected trailer, and particularly relates to a system and method which uses sensors disposed along the side of a tow vehicle to detect a vehicle in a zone adjacent the tow vehicle and connected trailer and in response takes at least one remedial measure for operating the tow vehicle.

BACKGROUND

Some vehicles today include autonomous and/or semi-autonomous functionality for vehicles for use in connecting to a trailer and pulling the connected trailer. One such function is a trailer merge warning (TMW) system in which sensors disposed on the tow vehicle sense a vehicle is disposed in proximity with the tow vehicle and trailer and is located in an adjacent lane to the lane in which the tow vehicle and connected trailer are located, and warns the driver of the existence of the vehicle when the tow vehicle attempts to merge into the adjacent lane occupied by the vehicle.

However, when a connected trailer is appreciably wide and/or appreciably close to the tow vehicle, the TMW system is unable to provide accurate and/or timely warnings using radar sensors that are mounted on or near the rear bumper of the tow vehicle because the wide trailer at least partly obstructs the field of view of the radar sensors. FIG. 4 depicts a tow vehicle having a radar sensor disposed along the back portion of the tow vehicle and a wide trailer towed by the tow vehicle. A TMW zone 400 is defined as being adjacent to the tow vehicle and the trailer and extends rearward of the trailer. Functionality of the TMW system is based upon the TMW zone 400 and particularly the presence of a second vehicle disposed in or approaching the TMW zone 400. Due to the width of the trailer and/or the trailer's closeness to the tow vehicle, a significant portion 401 of the TMW zone 400 is obstructed by the wide trailer, thereby adversely impacting the operation of the TMW system. As a result, relatively wide trailers such as fifth wheel and gooseneck trailers present an additional challenge to TMW systems of the tow vehicle.

SUMMARY

According to an example embodiment, there is disclosed a method for operating trailer assist function of a tow vehicle having a trailer connected thereto. The method includes receiving, by data processing hardware from a first sensor disposed along a first side of the tow vehicle, first sensor data of a first environment in a first field of view that is at least adjacent the first side of the tow vehicle and a corresponding side of the trailer. The data processing hardware determines a position of the at least one first sensor relative to the tow vehicle. Based at least partly on the position of the first sensor relative to the tow vehicle, the data processing hardware determines a zone having a length that is at least adjacent the side of the tow vehicle and the side of the trailer. The data processing hardware detects, based on the first sensor data, a second vehicle in or approaching the zone. In response to detecting the second vehicle in or approaching the zone, the data processing hardware performs at least one of sending a warning signal for warning a driver of the tow vehicle or sending a control signal for controlling the tow vehicle so that the tow vehicle and the trailer do not collide with the second vehicle.

The method may further include receiving, by the data processing hardware from at least one second sensor disposed along a rear portion of the tow vehicle, second sensor data of a second environment in a second field of view that is rearward of the tow vehicle, wherein detecting the second vehicle is based on the second sensor data. The data processing hardware determines a position of the at least one second sensor relative to the tow vehicle. The zone is determined based at least partly on the position of the at least one second sensor.

Detecting the second vehicle may include performing object detection using the first sensor data to create first object data, performing object detection using the second sensor data to create second object data, and fusing the first object data and the second object data to create fused object data. The second vehicle is detected based upon the fused object data.

The at least one first sensor may form part of a side mirror assembly of the tow vehicle. The at least one first sensor is disposed along a distal end portion of the side mirror assembly.

The side mirror assembly may be an adjustable side mirror assembly which is selectively translatable in a lateral direction relative to a longitudinal axis of the tow vehicle or selectively rotatable about a rotation axis.

The method may further include receiving, by the data processing hardware, position data corresponding to at least one of the adjustable side mirror assembly or the at least one first sensor relative to the tow vehicle, wherein determining the position of the at least one first sensor is based upon the received position data.

The method may also include selecting, by the data processing hardware, an environmental model from a plurality of environmental models based upon the position data, wherein determining the zone is based on the selected environmental model.

In one aspect, the method may include selecting, by the data processing hardware, an environmental model from a plurality of environmental models based upon the position data. Detecting the second vehicle in or approaching the zone may include detecting a distance of the second vehicle relative to the zone based upon the selected environmental model.

The data processing hardware may receive the position data from a position sensor forming part of or associated with the adjustable side mirror assembly.

The method may include determining or identifying, by the data processing hardware, the position of the at least one sensor relative to the first side of the tow vehicle. An environmental model may be selected from a plurality of environmental models based upon the position of the at least one sensor, wherein at least one of determining the zone or detecting the second vehicle in or approaching the zone is based upon the selected environmental model.

Another example embodiment is directed to a trailer assist system for a tow vehicle having a trailer connected thereto. The trailer assist system includes data processing hardware and non-transitory memory communicatively coupled to the data processing hardware and having stored therein program code instructions which, when executed by the data processing hardware, cause the data processing hardware to perform operations corresponding to the method described above.

BRIEF DESCRIPTION OF THE DRAWINGS

The present disclosure will become more fully understood from the detailed description and the accompanying drawings.

DETAILED DESCRIPTION

Figure 1:
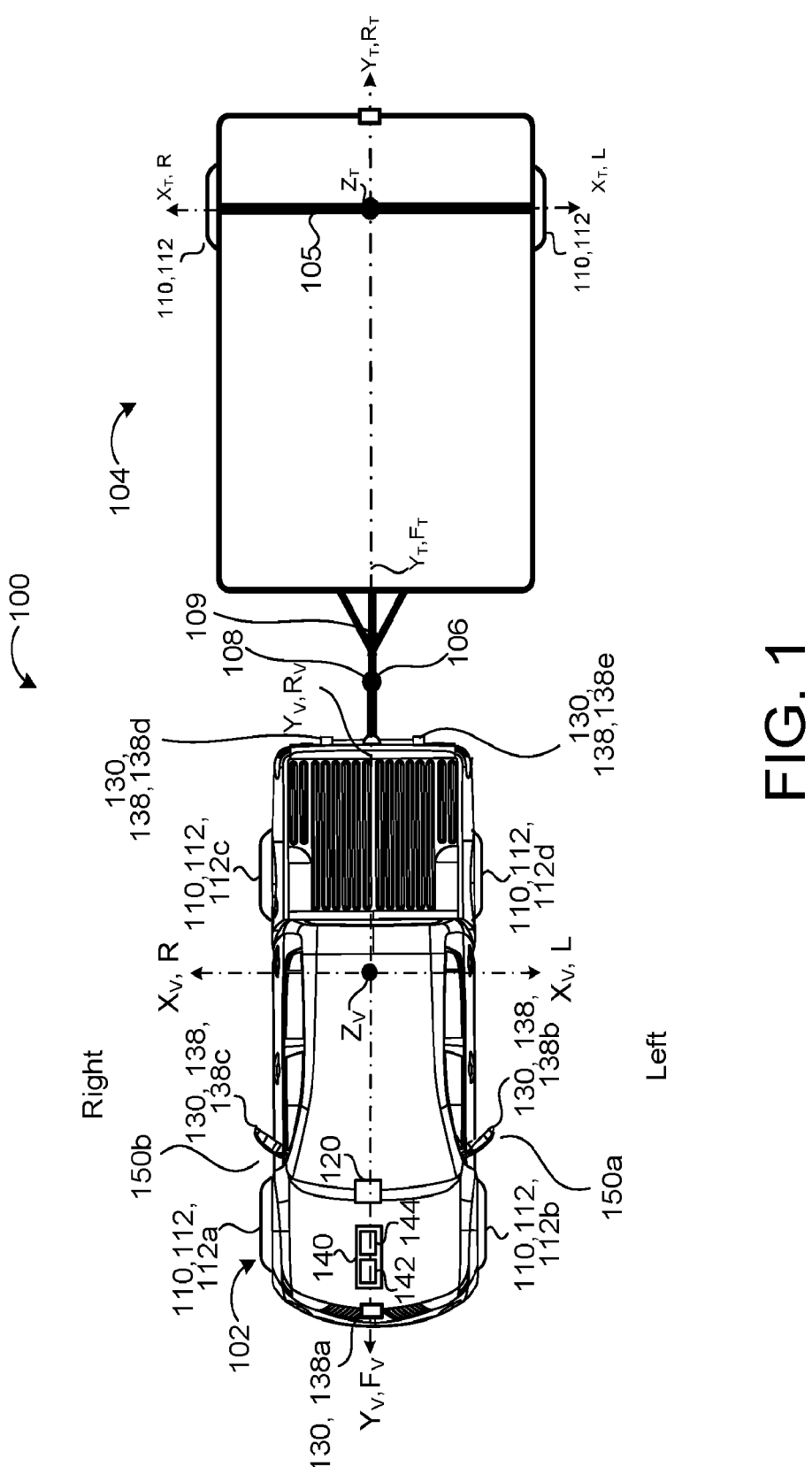
FIG. 1 is a schematic diagram of a tow vehicle hitched to a trailer according to an example embodiment.

The following description is merely exemplary in nature and is in no way intended to limit the disclosure, its application, or uses. For purposes of clarity, the same reference numbers will be used in the drawings to identify similar elements. It is understood that the elements, components, etc. depicted in the drawings are not drawn to scale unless so stated.

In general terms, example embodiments are directed to trailer assist system for a tow vehicle 102 which identifies a zone 402 adjacent and/or along a side of a tow vehicle 102 and a trailer 104 connected thereto, receives sensor data from at least one sensor disposed along the side of the tow vehicle 102, such as the side mirror of the vehicle, determines whether a second vehicle is in or is expected to enter the zone 402, and at least one of sends a warning message to warn the driver of the tow vehicle 102 or sends a vehicle control signal to control the tow vehicle 102 so that the tow vehicle and trailer 104 do not collide with the second vehicle. Because the sensor is disposed along the side of the vehicle at a distance therefrom, the sensor's field of view is considerably less obstructed by a wide trailer 104 (e.g., a fifth wheel or gooseneck trailer) than the amount of obstruction by the wide trailer 104 of a field of view corresponding to a sensor that is mounted along the rear of the tow vehicle 102. With a considerably less obstructed field of view, the trailer assist system is able to perform trailer assist functions with greater effectiveness.

Figure 2:
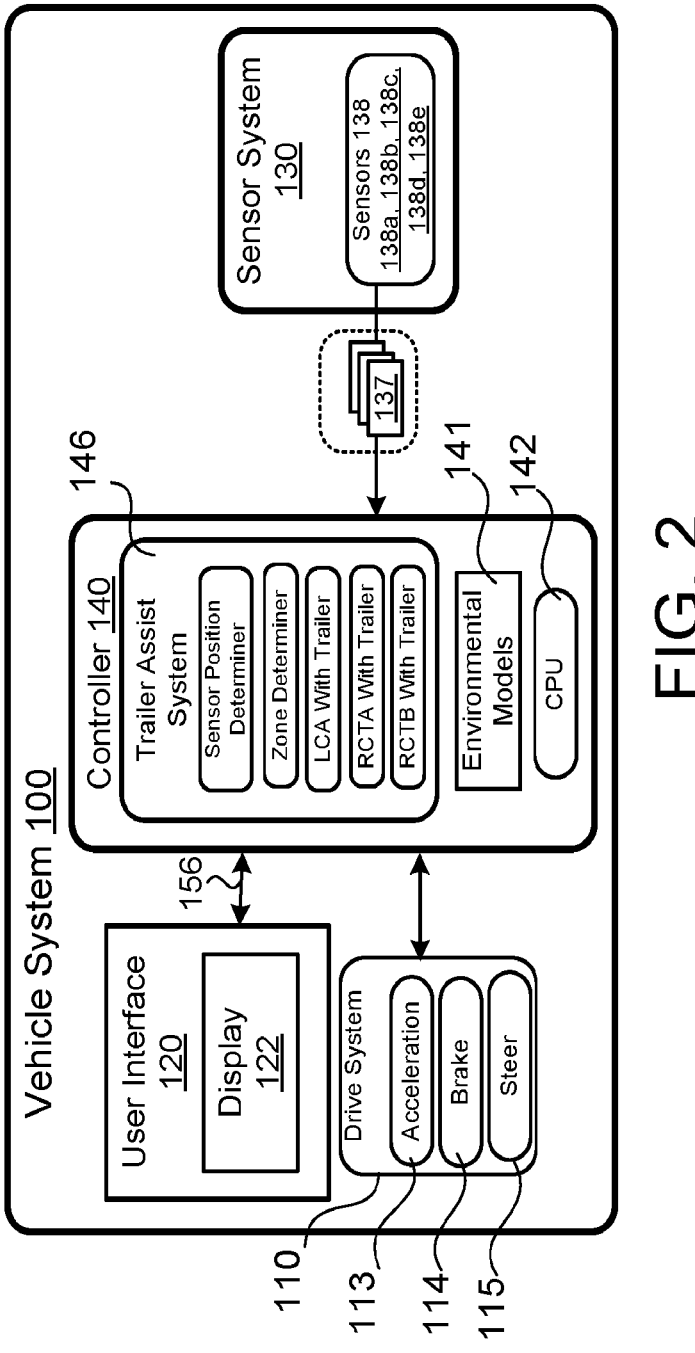
FIG. 2 is a block diagram of a vehicle system of the tow vehicle of FIG. 1 according to an example embodiment.

Referring to FIGS. 1 and 2, in some implementations, a vehicle driving system 100 includes a tow vehicle 102 hitched to a trailer 104 by way of a hitch 106. The tow vehicle 102 may be but is not limited to a car, a crossover, a truck, a van, a sports-utility-vehicle (SUV), and a recreational vehicle (RV). The trailer 104 may be any type of trailer including, for example, a gooseneck trailer or a fifth wheel trailer. The tow vehicle 102 includes a drive system

110 for maneuvering the tow vehicle 102 and thus trailer 104 across a road or other surface based on drive maneuvers or commands having x, y, and z components, for example. As shown, the drive system 110 includes a front right wheel 112, 112_a_, a front left wheel 112, 112_b_, a rear right wheel 112, 112_c_, and a rear left wheel 112, 112_d_. In addition, the drive system 110 may include wheels (not shown) associated with the trailer 104. The drive system 110 may include other wheel configurations as well. The drive system 110 includes other components (not shown) that are in communication with and connected to the wheels 112 that allow the tow vehicle 102 to move, thus moving the trailer 104 as well. The drive system 110 may also include a brake system 114 that includes brakes associated with each wheel 112, 112_a-d_, where each brake 116 is configured to slow down or stop the wheel 112_a_-112_d_ from rotating. In some examples, the brake system 114 is connected to one or more brakes supported by the trailer 104. The drive system 110 may also include an acceleration system 113 that is configured to adjust a speed of the tow vehicle 102 and trailer 104, and a steering system 115 that is configured to adjust a direction of the tow vehicle 102 and trailer 104. The vehicle driving system 100 may include other systems as well.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$ extends between a right side R and a left side L of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and or the $Y_V$ axis, or move along the central vertical axis $Z_V$. As the tow vehicle 102 moves, the trailer 104 follows along a path of the tow vehicle 102. Therefore, when the tow vehicle 102 makes a turn as it moves in the forward direction $F_V$, the trailer 104 follows along.

Moreover, the trailer 104 follows the tow vehicle 102 across the road surface by various combinations of movements relative to three mutually perpendicular axes defined by the trailer 104: a trailer transverse (pitch) axis $X_T$, a trailer fore-aft (roll) axis $Y_T$, and a trailer central vertical (yaw) axis $Z_T$. The trailer transverse axis $X_T$ extends between a right side R and a left side L of the trailer 104, for example, along the trailer axle 105. A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle driving system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$. Therefore, when the tow vehicle 102 makes a turn as it moves in the forward direction $F_V$, the trailer 104 follows along. While turning, the tow vehicle 102 and the trailer 104 form a trailer angle being an angle between the vehicle fore-aft axis $Y_V$ and the trailer fore-aft axis $Y_T$.

The tow vehicle 102 may include a user interface 120, such as a display 122. The user interface 120 is configured to display information to the driver of the tow vehicle. In some examples, the user interface 120 is configured to receive one or more user commands from the driver via one or more input mechanisms and/or displays one or more notifications to the driver. In some examples, the one or more input mechanisms of the user interface 120 includes the display 122 being a touch screen display. In other examples, the one or more input mechanisms of the user interface 120 includes a rotary knob or a mouse to make a selection or otherwise provide information.

The tow vehicle 102 includes a sensor system 130 to provide sensor system data 137 that may be used to determine one or more measurements associated with an environment of the tow vehicle 102, the trailer 104, and/or objects surrounding the tow vehicle 102. In some examples, the sensor system 130 provides for reliable and robust autonomous or semi-autonomous driving. The sensor system 130 may include different types of sensors that may be used separately or with one another to create a perception of the tow vehicle's environment or a portion thereof that is used by the vehicle driving system 100 to determine measurements and/or identify object(s) in its environment and/or in some examples autonomously drive and make intelligent decisions based on objects and obstacles detected using the sensor system 130. The tow vehicle 102 may support the sensor system 130 while in other examples, the sensor system 130 is supported by both the tow vehicle 102 and the trailer 104. The sensor system 130 may include sensor(s) 138 positioned on the rear vehicle bumper and/or on the front bumper of the tow vehicle 102.

With the sensor system 130 providing the sensor data 137 sensed by sensors 138, the sensor system 130 is especially useful for receiving information of the environment or portion of the environment of the vehicle 102 and for increasing safety in the vehicle driving system 100 which may be operated by the driver, or under semi-autonomous or autonomous conditions.

As shown in FIG. 1, the sensors 138 of the sensor system 130 include one or more sensors 138a-138e. Sensors 138a-138e are mounted onto the tow vehicle 102. In the illustrated embodiment, sensor 138a is mounted along a front end portion of the tow vehicle 102, sensors 138b and 138c are disposed along the two lengthwise sides of the tow vehicle 102, and sensors 138d-138e are disposed along a rear end portion of the tow vehicle 102, such as along the rear bumper thereof. In one implementation, sensors 138 are radar sensors but it is understood that sensors 138 may be other types of sensors, such as imaging devices (e.g., cameras which capture images of an environment of the tow vehicle 102 and may be used in providing a surround view thereof, for example); sonar sensors; LIDAR (Light Detection and Ranging) sensors which can entail optical remote sensing that measures properties of scattered light to find range and/or other information of a distant target); LADAR (Laser Detection and Ranging) sensors; and ultrasonic sensors. Further, sensors 138 may include a combination of the above-mentioned types sensors, and the sensors 138 may be disposed along the tow vehicle at positions other than as described above with respect to sensors 138a-138e. For example, sensors 138 may be mounted along the c pillars, the dual rear wheel fender flares, and/or side fenders of the tow vehicle. For reasons of simplicity and unless otherwise stated, the sensors 138 of the trailer assist system 146 will be described below as being radar sensors.

Referring to FIGS. 1 and 2, the drive system 110, the user interface 120, and the sensor system 130 are in communication with a vehicle controller 140 that includes a computing device (or data processing hardware) 142 (e.g., central processing unit having one or more computing processors)

in communication with non-transitory memory or hardware memory 144 (e.g., a hard disk, flash memory, random-access memory, such as volatile and/or non-volatile memory) capable of storing program code instructions executable on the computing processor(s)). In some examples, the non-transitory memory 144 stores program code instructions which when executed on the computing device 142 cause the vehicle controller 140 to provide signals or commands which control or facilitate the control of the tow vehicle 102 in a forward or reverse direction, either autonomously or semi-autonomously. Such instructions form at least part of a trailer assist system 146. In an implementation, the trailer assist system 146 cooperates with the user interface 120, the drive system 110 and the sensor system 130. As shown, the vehicle controller 140 is supported by the tow vehicle 102; however, the vehicle controller 140 may be separate from the tow vehicle 102 and in communication with the tow vehicle 102 via a network (not shown).

Figure 3A:
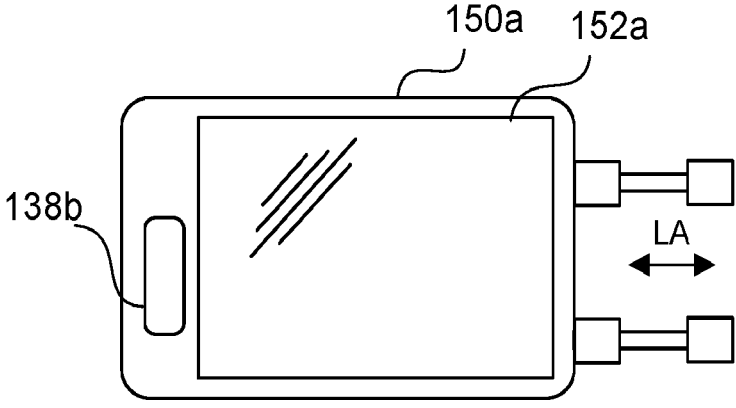
FIGS. 3A and 3B are front elevational views of adjustable side mirror assemblies of the tow vehicle of FIG. 1.
Figure 3B:
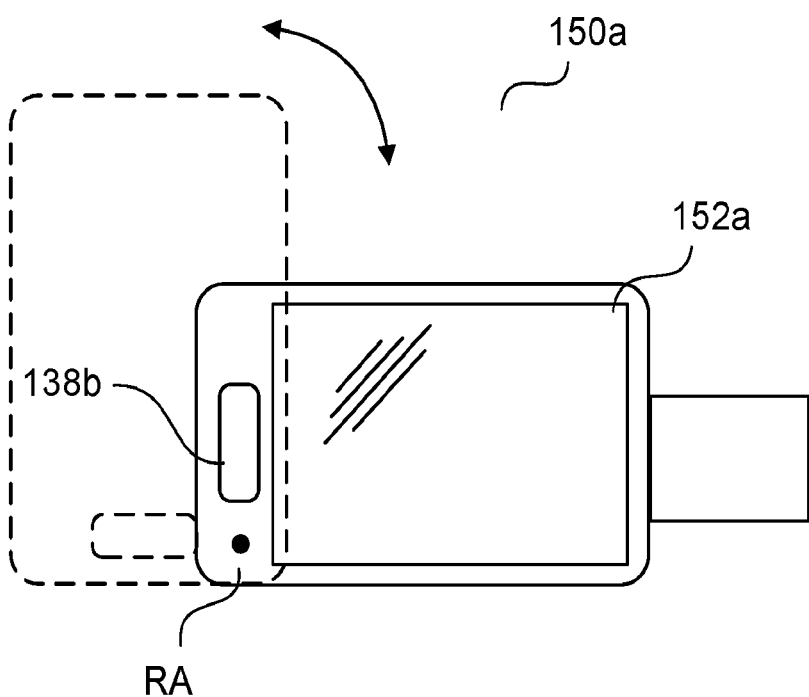
Figure 4:
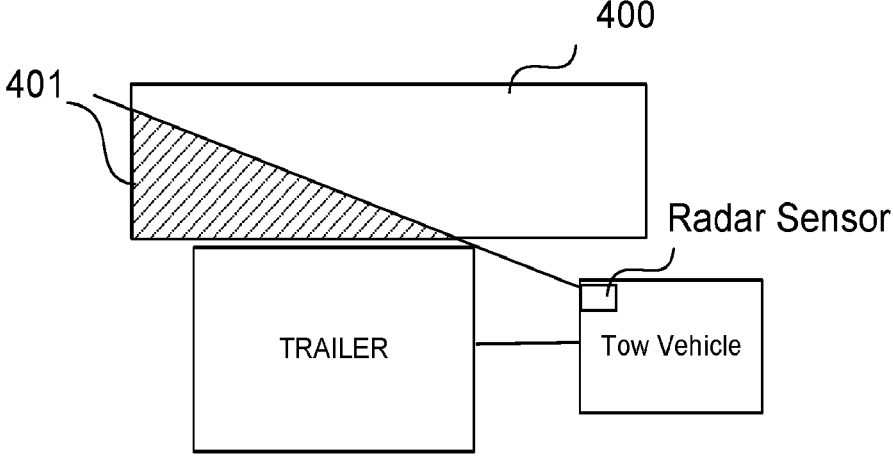
FIG. 4 is a schematic representation of a tow vehicle and trailer along with a TMZ zone adjacent thereto according to a known TMW function.

As mentioned, the sensors 138b and 138c are disposed along left and right lengthwise sides of the tow vehicle 102, respectively. In one implementation, each of sensors 138b and 138c forms part of a side mirror assembly 150a and 150b, respectively. Referring to FIGS. 3A and 3B, left side mirror assembly 150a includes a mirror 152a which is adjustable (i.e., rotatable along at least one axis) within the housing of the mirror assembly 150a. Sensor 138b is disposed along the distal end portion of the mirror assembly 150a. In another implementation, the sensor 138b is disposed above or below the mirror 152a of the left side mirror assembly 150. In implementations in which the sensors 138b and 138c are radar sensors, such sensors are placed below the corresponding mirror 152 due to mechanical limitations to packaging the sensor 138b, 138c behind the mirror 152. Placement of the sensor 138b furthest from the body of the tow vehicle 102 (i.e., in this case, a left door and/or side panel) results in the field of view of sensor 138b that is less obstructed by the trailer 104, even if the trailer 104 is a relatively wide gooseneck or fifth wheel trailer.

It is understood that right side mirror assembly 150b, including a mirror 152 and the sensor 138c, is roughly the mirror image of left side mirror assembly 150a depicted in FIGS. 3A and 3B.

In some implementations, the lateral distance or rotational position of the side mirror assembly 150a or 150b from the lengthwise side of the tow vehicle 102 may be adjustable by the driver of the tow vehicle 102 using one or more electromechanical controls in the passenger compartment of the tow vehicle near the driver's seat. If the positioning of the side mirror assembly 150a, 150b relative to the tow vehicle 102, such as the side of the vehicle or the longitudinal fore-aft axis $Y_V$, is adjustable in the lateral direction orthogonal to the longitudinal fore-aft axis $Y_V$, the positioning of the corresponding sensor 138, which forms part of the side mirror assembly 150, also varies relative to the tow vehicle 102. FIG. 3A shows the selective lateral adjustment LA, relative to the lengthwise side of the tow vehicle 102 and the longitudinal fore-aft axis $Y_V$ (not shown in FIG. 3). FIG. 3B shows the left side mirror assembly 150a being rotatably adjustable, either manually or electromechanically, about a rotation axis or point RA which results in sensor 138b also rotating about rotation axis RA. Rotation axis RA may be parallel to the longitudinal fore-aft axis $Y_V$ of the tow vehicle 102. Rotation of the mirror assembly 150a about rotation axis RA causes not only rotation of sensor 138b but also displacement of the sensor 138b in both lateral and longitudinal directions.

The trailer assist system 146 uses an environmental model 141 associated with the tow vehicle 102 for performing trailer assist related operations, for example. Specifically, the environmental model 141 defines parameters such as sensor position relative to the tow vehicle 102 for use in, for example, determining the position of a detected object in sensor data and determining the dimensions and location of the (TMW) zone 402. With the position of sensors 138*b* and 138*c* being adjustable, the trailer assist system 146 includes a plurality of environmental models 141 stored in the memory 144, with each environmental model 141 corresponding to a distinct position and/or range of positions for sensors 138*b* and 138*c*. The lateral or rotational position of the side mirror assemblies 150*a*, 150*b*, and thus the lateral or rotational position of the corresponding sensor 138*b*, 138*c* relative to the tow vehicle 102 and particularly the lengthwise side or the fore-aft axis $Y_V$ of the tow vehicle, may be determined, for example, by a position sensor associated with each side mirror assembly or based upon sensor data sensed by the corresponding sensor 138*b* or 138*c*. With the lateral or rotational position of the mirror assembly 150 and/or the corresponding sensor 138 determined, the controller 140 of the trailer assist system 146 selects the appropriate environmental model 141 for use in performing trailer assist operations.

In example embodiments, the trailer assist system 146 uses sensor data 137 from sensors 138*b*-138*e*, and particularly from sensors 138*b* and 138*c*, to perform various trailer assist functions for the tow vehicle 102. Use of sensors 138*b* and 138*c* increases the field of view of the trailer assist system 146 so as to cover most of the entire TMW zone 402 adjacent the trailer 104 which extends rearward of the trailer 104. In some implementations, the TMW zone 402 is extended sufficiently rearward of the wide trailer 104 due to use of sensors 138*b* and 138*c* so as to enable lane change assist (LCA), rear cross traffic alert (RCTA) and rear cross traffic with braking (RCTB) functionality with wide trailers such as trailer 104.

Figure 5:
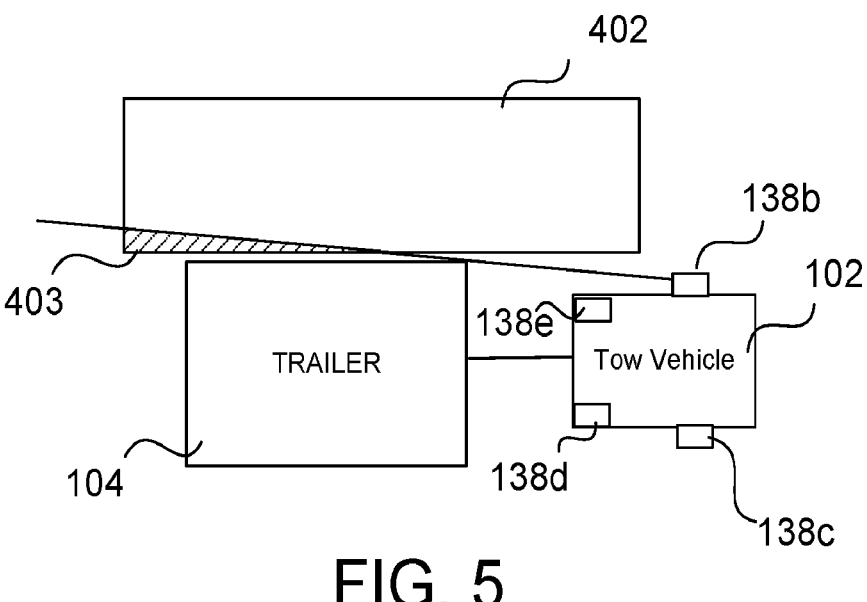
FIG. 5 is a schematic representation of the tow vehicle and trailer of FIG. 1 along with an adjacent TMZ zone according to an example embodiment.

FIG. 5 depicts the tow vehicle 102 with the sensors 138*b* and 138*c* and the connected trailer 104. Through use of the sensors 138*b* and 138*c*, the obstructed portion 403 of the TMW zone 402 is much less than the amount of obstruction when only sensors 138*d* and 138*e* are used in performing trailer assist functions.

In one example embodiment, only sensors 138*b* and 138*c* are used in performing TMW and/or other trailering functions (e.g., LCA, RCTA and RCTB with trailers). For each zone 402 (left and right) that is adjacent the tow vehicle 102 and the trailer 104 and extends rearwardly therefrom, object detection and recognition are performed to detect and identify objects, i.e., other vehicles, that are disposed in or approaching the zone 402.

In another example embodiment, sensors 138*b*-138*e* are used in performing TMW and/or other trailering functions. In this embodiment, sensor data 137 from sensors 138*b* and 138*e* on the left side of the tow vehicle 104 are fused to detect objects in or around the now-expanded zone 402 adjacent to the tow vehicle 102, the trailer 104 and extending in the rearward direction relative to the trailer 104. In an implementation, object fusion is performed on the sensor data provided by the sensors 138*b* and 138*e*. Specifically, objects are detected in the sensor data 137 from the sensor 138*b* to generate object data, and objects are similarly detected in the sensor data 137 from the rear sensor 138*e* to generate object data, and the object data generated is fused to create fused or composite object data. The fused/composite object data is then used in performing TMW functions and/or in performing LCA, RCTA and RCTB functions for a tow vehicle 102 and the connected trailer 104.

For clarity, the LCA function provides an indication to the driver of the tow vehicle that it is dangerous to change lanes because of 1) a moving vehicle in an adjacent lane resides in a blind spot zone 402; and 2) a moving vehicle is about to enter the zone 402 in a predetermined period of time, such as a few seconds. The LCA function reduces the number of accidents happening during lane change scenarios as a consequence of the driver overseeing parallel driving vehicles in the blind spot zone 402 approaching vehicles with high relative speed.

The RCTA and RCTB functions indicate to the driver that it is dangerous to continue the backing up maneuver because of 1) a moving vehicle will intersect the predicted backing up path causing an accident; and/or 2) other moving road users (e.g., bicycles, small motorcycles, pedestrians) will intersect the predicted backing up path causing an accident. If the tow vehicle driver does not react by changing the speed or direction, then RCTB function will send a brake request to the brake system 114 in order to automatically stop or slow the tow vehicle 102. The RCTA and RCTB functions serve to reduce the number of accidents caused by the limited field of view of the driver of the tow vehicle 102 that is backing up from a parking space or wrong speed estimation.

Figure 6:
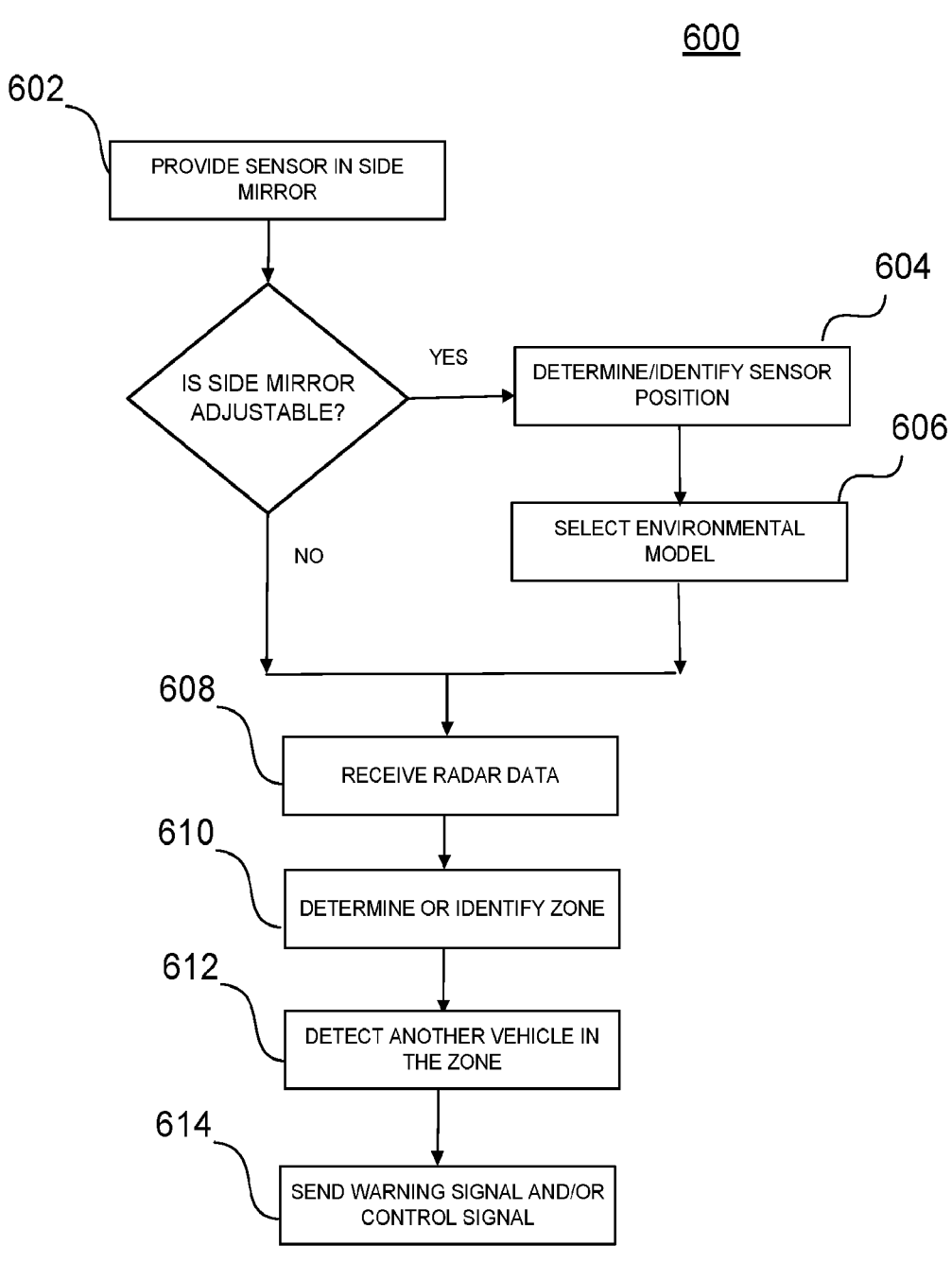
FIG. 6 is a flowchart illustrating a trailer assist function according to an example embodiment.

A method 600 of the trailer assist system 146 in performing a trailer assist function will be described with respect to FIG. 6. The method 600 will be described as using sensor 138*b* and it is understood that the same actions are used in using sensor 138*c*. Initially, at 602 sensor 138*b* is provided as part of the side mirror assembly 150 (in this case, left side mirror assembly 150*a*) of the tow vehicle 102. If the position of the side mirror assembly 150*a* to the tow vehicle 102 is adjustable, such as in a lateral direction LA or rotationally about a rotational axis RA, the controller 140 determines or identifies at 604 the position of the sensor 138*b* relative to the tow vehicle 102. The lateral sensor position may be relative to a location on the corresponding side door of the tow vehicle 102 or another point on the tow vehicle, such as a point along the fore-aft axis $Y_V$ of the tow vehicle 102. The lateral or rotational sensor position may be determined, for example, using a position sensor that is part of or otherwise associated with the side mirror assembly 150, using the sensor data 137 and/or using known positioning control of the mirror assembly 150. Based upon the sensor position, the controller 140 selects at 606 one environmental model 141 associated with the sensor 138*b* from any of a plurality of environmental models 141 stored in the memory 144. The selected environmental model 141 is then used in subsequent blocks described below.

Next, the controller 140 at 608 receives from the sensor 138*b* sensor data 137 of the environment in a field of view of the sensor that is at least adjacent the left side of the tow vehicle 102 and a corresponding side of the trailer 104. The controller 140 determine at 610 or identifies the zone 402 having a length that is at least adjacent the side of the tow vehicle and the side of the trailer 104 and extends beyond the rear of the trailer 104. The zone 402 may be determined based on at least one of the type of sensor 138*b*, the lateral and/or rotational position of the sensor 138*b* relative to the tow vehicle 102, the sensor data 137 and/or the field of view of the sensor 138*b*. At 612, the controller 140 detects another vehicle disposed within or approaching the zone 402 based upon the sensor data 137 from the sensor 138*b*. The vehicle may be detected using known object detection techniques. The controller 140 also determines the location of the other vehicle in or around the zone 402, and may also classify the detected object as a vehicle. In determining that the other vehicle is approaching the zone 402, the controller 140 may estimate that the vehicle will soon enter the zone 402, such in a predetermined number of seconds. Any of a number of known techniques may be used to detect, locate and classify the other vehicle. In some implementations, the trailer assist system 146 uses artificial intelligence and in particular machine learning to detect, locate and/or classify the vehicle. A neural network, such as a convolution neural network, may be utilized.

In response to detecting the vehicle in or approaching the zone 402, the controller 140 performs at 614 at least one of sending a warning signal for warning the driver of the tow vehicle 102 of the presence of the other vehicle, such as part of a TMW function, an LCA function, or an RCTA function. For example, the warning signal may be sent to the user interface 120 for providing an audible and/or visual warning to the driver. In addition or in the alternative, the controller 140 sends at least one control signal for controlling the tow vehicle so that the tow vehicle 102 and the trailer 104 do not collide with the other, detected vehicle. This control signal may be sent to, for example, the brake system 114 and/or the steering system 115 for autonomously maneuvering the tow vehicle 102, which may form part of an RCTB function.

If sensor 138e is also utilized by the trailer assist system 146, the method 600 may include receiving sensor data 137 from the sensor 138e, detecting the other vehicle in or approaching the zone 402 using the sensor data from the sensor 138e, and fusing the detected object data from the sensor data 137 of the sensor 138b with the detected object data from the sensor data 137 of the sensor 138e to obtain fused object data. The fused object data is then used for detecting the vehicle in or approaching the zone 402 in block 612.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for operating trailer assist function of a tow vehicle having a trailer connected thereto, the method comprising:

receiving, by data processing hardware from a first sensor disposed along a first side of the tow vehicle, first sensor data of a first environment in a first field of view that is at least adjacent the first side of the tow vehicle and a corresponding side of the trailer;

determining, by the data processing hardware, a position of the at least one first sensor relative to the tow vehicle;

based at least partly on the position of the first sensor relative to the tow vehicle determining, by the data processing hardware, a zone having a length that is at least adjacent the side of the tow vehicle and the side of the trailer;

detecting, by the data processing hardware based on the first sensor data, a second vehicle in or approaching the zone;

in response to detecting the second vehicle in or approaching the zone, performing, by the data processing hardware, at least one of sending a warning signal for warning a driver of the tow vehicle or sending a control signal for controlling the tow vehicle so that the tow vehicle and the trailer do not collide with the second vehicle;

receiving, by the data processing hardware from at least one second sensor disposed along a rear portion of the tow vehicle, second sensor data of a second environment in a second field of view that is rearward of the tow vehicle, wherein detecting the second vehicle is based on the second sensor data;

determining or identifying, by the data processing hardware, a position of the at least one second sensor relative to the tow vehicle, wherein the zone is determined based at least partly on the position of the at least one second sensor; and wherein detecting the second vehicle comprises performing object detection using the first sensor data to create first object data, performing object detection using the second sensor data to create second object data, and fusing the first object data and the second object data to create fused object data, wherein the second vehicle is detected based upon the fused object data.

2. The method of claim 1, wherein the at least one first sensor forms part of a side mirror assembly of the tow vehicle, and the at least one first sensor is disposed along a distal end portion of the side mirror assembly.

3. The method of claim 2, wherein the side mirror assembly comprises an adjustable side mirror assembly which is selectively translatable in a lateral direction relative to a longitudinal axis of the tow vehicle or selectively rotatable about a rotation axis.

4. The method of claim 3, further comprising receiving, by the data processing hardware, position data corresponding to a position of at least one of the adjustable side mirror assembly or the at least one first sensor relative to the tow vehicle, wherein determining the position of the at least one first sensor is based upon the received position data.

5. The method of claim 4, further comprising selecting, by the data processing hardware, an environmental model from a plurality of environmental models based upon the position data, wherein determining the zone is based on the selected environmental model.

6. The method of claim 4, further comprising selecting, by the data processing hardware, an environmental model from a plurality of environmental models based upon the position data, wherein detecting the second vehicle in or approaching the zone comprises detecting a distance of the second vehicle relative to the zone based upon the selected environmental model.

7. The method of claim 4, wherein the data processing hardware receives the position data from a position sensor forming part of or associated with the adjustable side mirror assembly.

8. The method of claim 1, further comprising selecting an environmental model from a plurality of environmental models based upon the position of the at least one sensor, wherein at least one of determining the zone or detecting the second vehicle in or approaching the zone is based upon the selected environmental model.

9. A trailer assist system for a tow vehicle having a trailer connected thereto, the trailer assist system comprising:

data processing hardware and non-transitory memory communicatively coupled to the data processing hardware and having stored therein program code instructions which, when executed by the data processing hardware, cause the data processing hardware to perform;

receiving, from a first sensor disposed along a first side of the tow vehicle, first sensor data of a first environment in a first field of view that is at least adjacent the first side of the tow vehicle and a corresponding side of the trailer;

determining a position of the at least one first sensor relative to the tow vehicle;

based at least partly on the position of the at least one first sensor, determining a zone having a length that is at least adjacent the side of the tow vehicle and the side of the trailer;

detecting, based at least partly on the first sensor data, a second vehicle in or approaching the zone;

in response to detecting the second vehicle in or approaching the zone, performing at least one of sending a warning signal for warning a driver of the tow vehicle or sending a control signal for controlling the tow vehicle so that the tow vehicle and the trailer do not collide with the second vehicle;

receiving, from at least one second sensor disposed along a rear portion of the tow vehicle, second sensor data of a second environment in a second field of view that is rearward of the tow vehicle, wherein detecting the second vehicle is based on the second sensor data;

determining or identifying a position of the at least one second sensor relative to the tow vehicle, wherein the zone is determined based at least partly on the position of the second sensor; and wherein detecting the second vehicle comprises performing object detection using the first sensor data to create first object data, performing object detection using the second sensor data to create second object data, and fusing the first object data and the second object data to create fused object data, wherein the second vehicle is detected based upon the fused object data.

10. The trailer assist system of claim 9, wherein the at least one first sensor forms part of a side mirror assembly of the tow vehicle, and the at least one first sensor is disposed along a distal end portion of the side mirror assembly.

11. The trailer assist system of claim 10, wherein the side mirror assembly comprises an adjustable side mirror assembly which is selectively translatable in a lateral direction relative to a longitudinal axis of the tow vehicle or selectively rotatable about a rotation axis.

12. The trailer assist system of claim 9, wherein the instructions, when executed by the by the data processing hardware, cause the data processing hardware to further perform receiving position data corresponding to a position of at least one of the adjustable side mirror assembly or the at least one first sensor relative to the tow vehicle, wherein determining the position of the at least one first sensor is based upon the received position data.

13. The trailer assist system of claim 12, wherein the instructions, when executed by the by the data processing hardware, cause the data processing hardware to further perform selecting an environmental model from a plurality of environmental models based upon the received position data, wherein determining the zone is based on the selected environmental model.

14. The trailer assist system of claim 12, wherein the data processing hardware receives the position data from a position sensor forming part of or associated with the adjustable side mirror assembly.

15. The trailer assist system of claim 12, wherein the instructions, when executed by the by the data processing hardware, cause the data processing hardware to further perform selecting an environmental model from a plurality of environmental models based upon the position data, and wherein detecting the second vehicle in or approaching the zone comprises detecting a distance of the second vehicle relative to the zone based upon the selected environmental model.

16. The trailer assist system of claim 9, wherein the instructions, when executed by the data processing hardware, cause the data processing hardware to further perform determining the position of the at least one sensor relative to the first side of the tow vehicle, and selecting an environmental model from a plurality of environmental models based upon the position of the at least one sensor, wherein at least one of determining the zone or detecting the second vehicle in or approaching the zone is based upon the selected environmental model.

* * * * *